United States Patent [19]

Rohrberg et al.

[11] Patent Number: 4,872,355

[45] Date of Patent: Oct. 10, 1989

[54] MICROCUBE INTERCONNECTION HARDWARE

[76] Inventors: Roderick G. Rohrberg, 2742 W. 234th St., Torrance, Calif. 90505; Timothy K. Rohrberg, 2800 Plz. Del Amo #406, Torrance, Calif. 90505; Kevin D. McGushion, 2450 Oak St. #E, Santa Monica, Calif. 90405

[21] Appl. No.: 196,993

[22] Filed: May 20, 1988

[51] Int. Cl.$^4$ .................. G01D 11/30; G01F 15/18; G01L 19/00; G01K 1/14
[52] U.S. Cl. .................. 73/866.5; 73/201; 73/756; 374/147; 285/150
[58] Field of Search .............. 73/431, 866.5, 23, 201, 73/756; 285/150, 189, 286; 374/147, 148, 208

[56] References Cited

U.S. PATENT DOCUMENTS

| | | | |
|---|---|---|---|
| 3,901,082 | 8/1975 | Lyon | 73/719 X |
| 3,926,055 | 12/1975 | Garnett | 73/720 |
| 4,037,758 | 7/1977 | Bourque | 366/96 X |
| 4,216,702 | 8/1980 | Brundidge et al. | 91/436 |
| 4,696,296 | 9/1987 | Palmer | 128/207.16 |
| 4,703,664 | 11/1987 | Kirkpatrick et al. | 73/756 X |

Primary Examiner—Tom Noland
Attorney, Agent, or Firm—Thomas N. Giaccherini

[57] ABSTRACT

Three embodiments of MicroCube Interconnection Hardware are disclosed: the MicroVac Vacuum Generator, the MicroControl Module, and the MicroSensor. Each embodiment is a combination of a MicroCube Precision Fitting and Various enhancements which provide precision control, regulation, or measurement of flows of gas or liquid in a semiconductor fabrication environment. The Microcube Precision Fitting is a substantially cubical unitary body that includes a central chamber and at least one external port. Each port comprises an annular counterbored step surrounded by a support wall which both enclose an aperture that extends into the central chamber. The MicroVac Vacuum Generator is a combination of a MicroCube Precision Fitting and three appendages: an inlet, a contaminant port, and an outlet. A first stage fits inside the inlet and is disposed coaxially to a second stage that resides within the outlet.

13 Claims, 4 Drawing Sheets

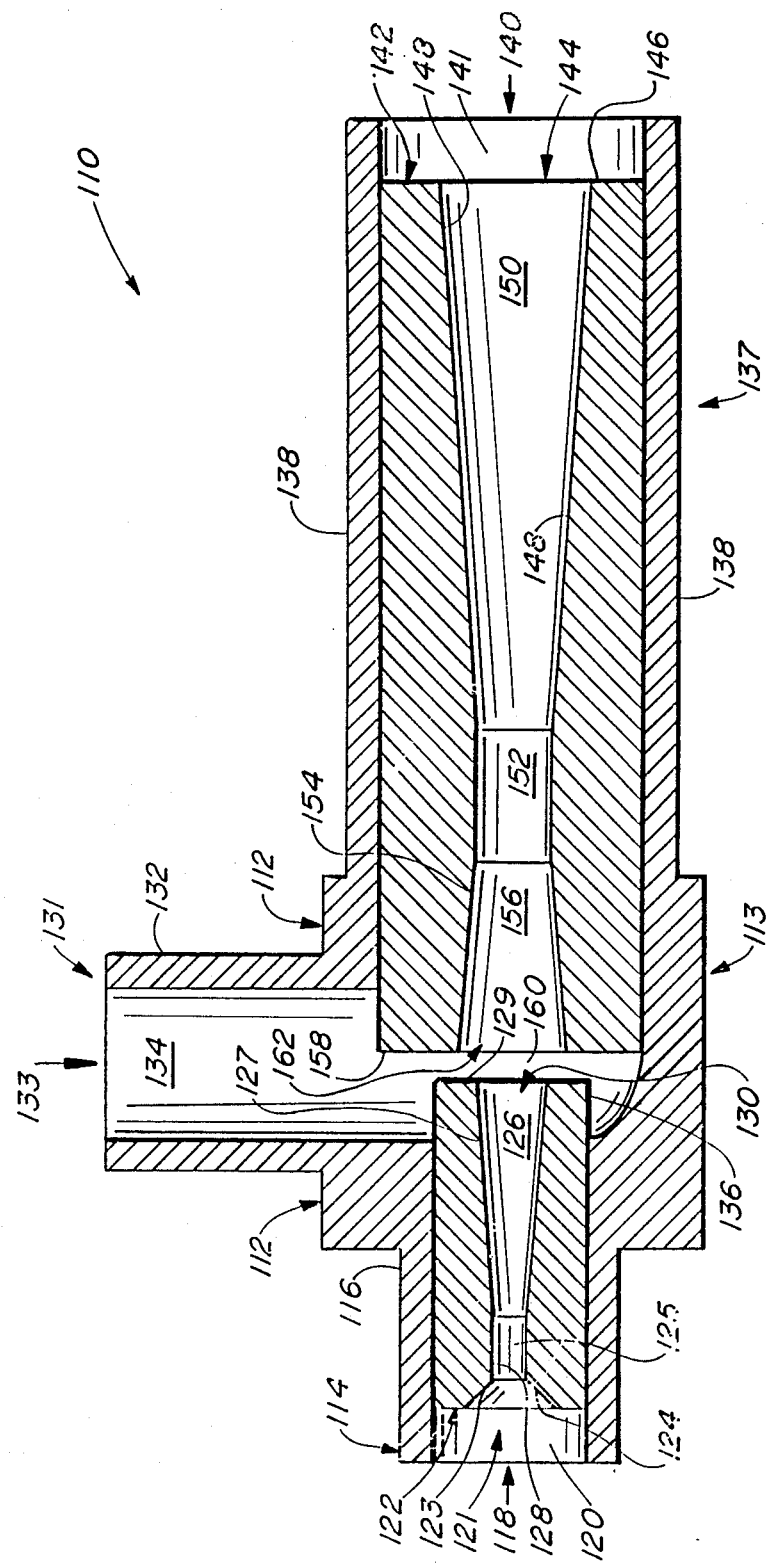
FIG._1.

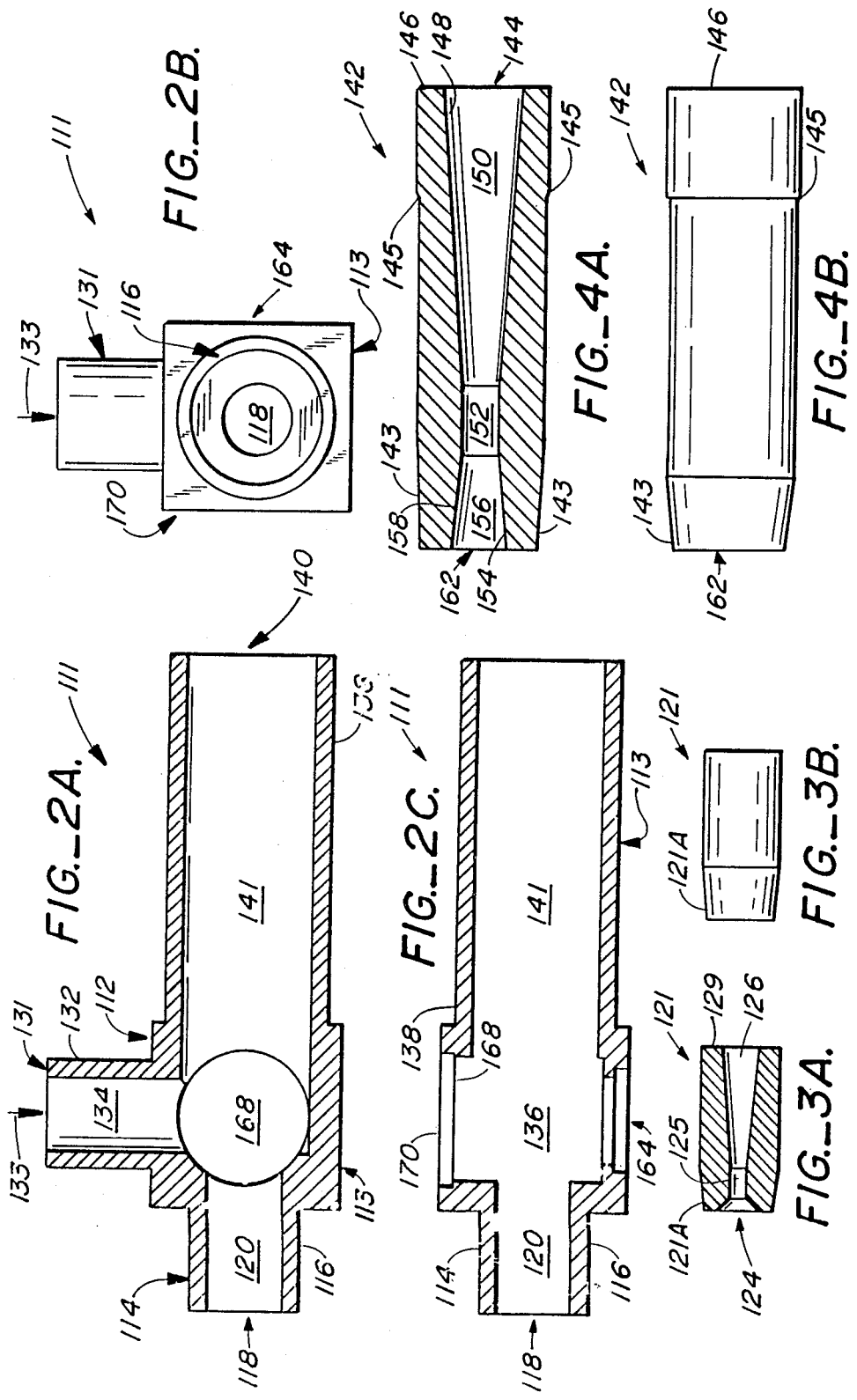

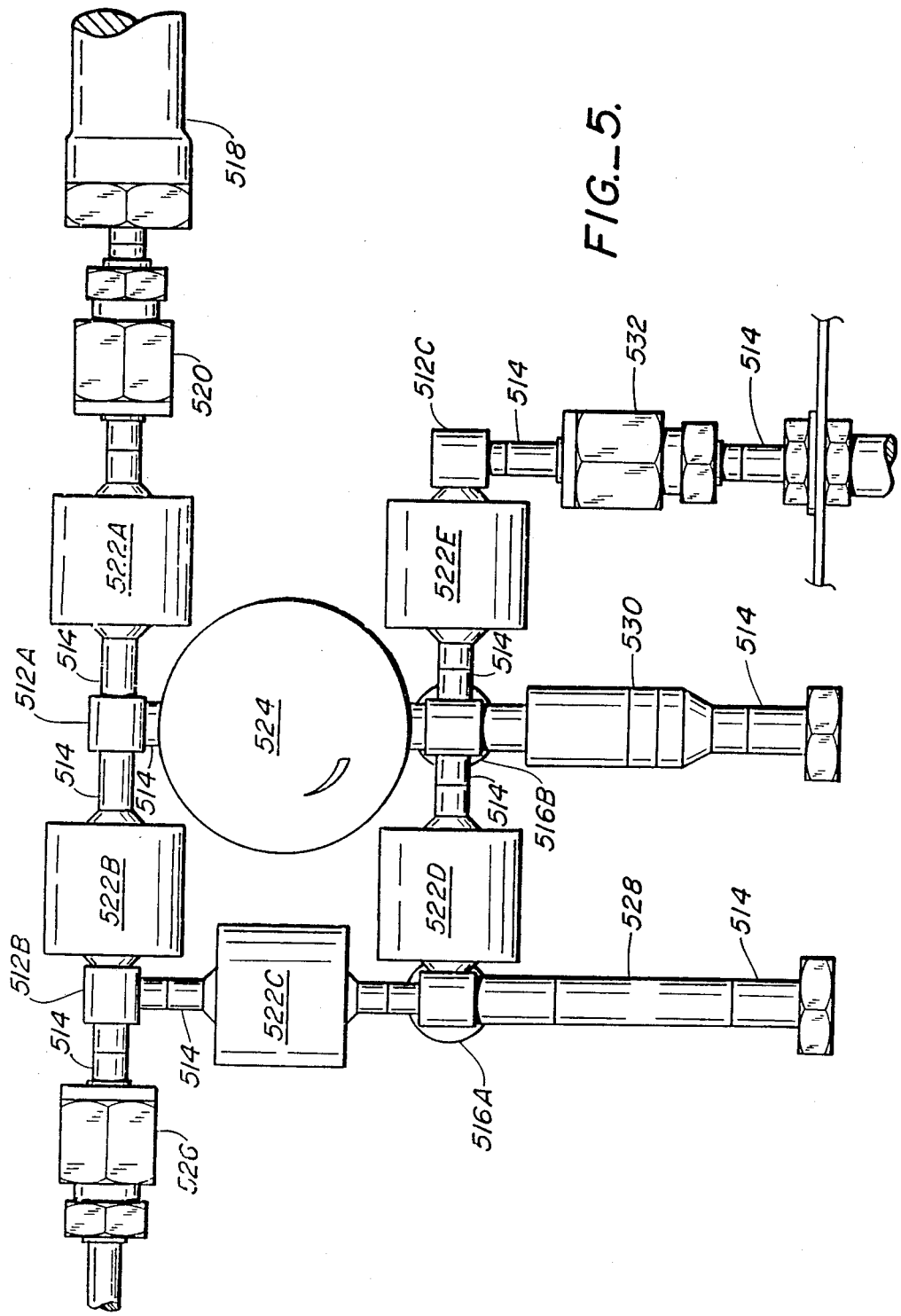
FIG._5.

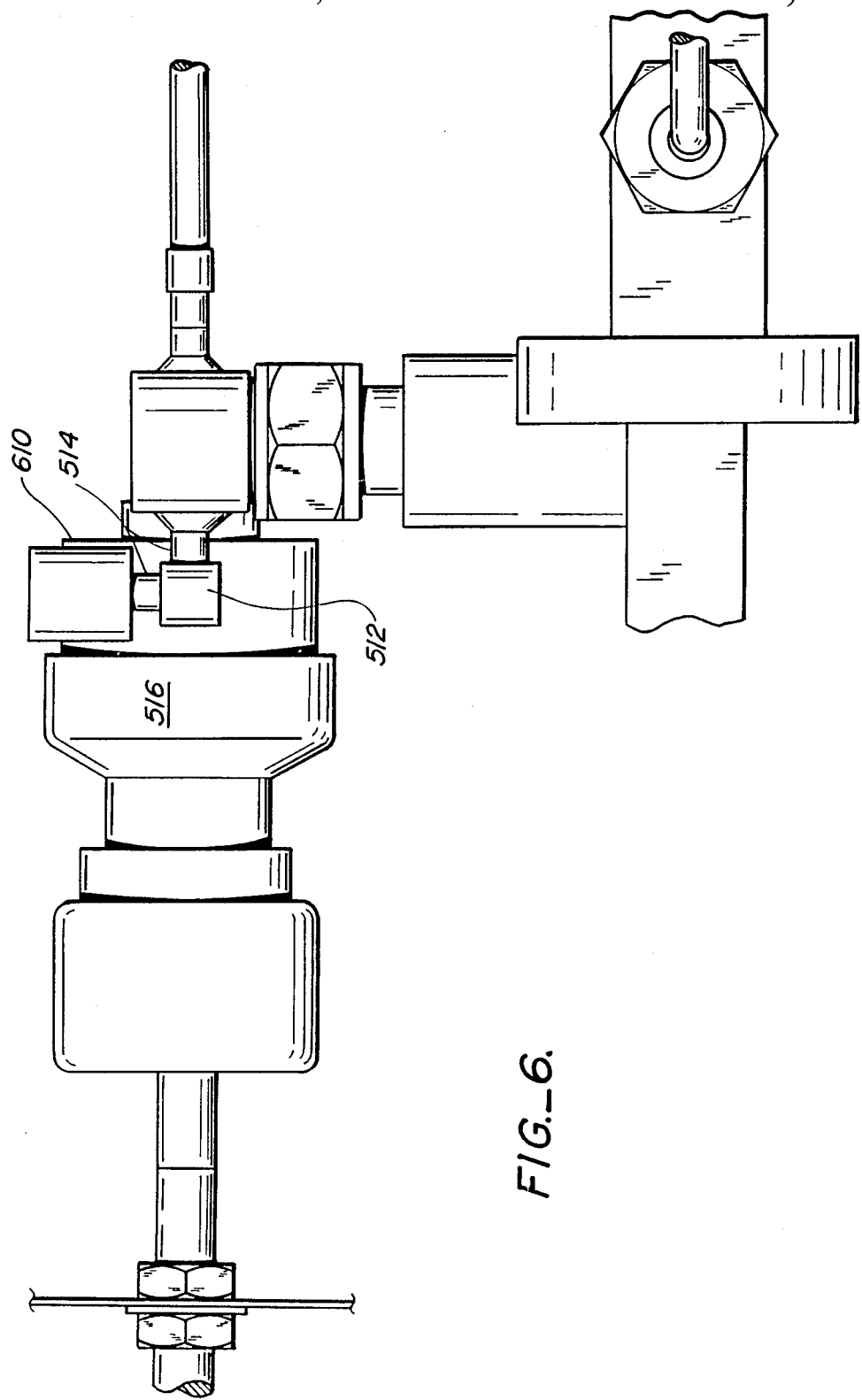
FIG._6.

MICROCUBE INTERCONNECTION HARDWARE

BACKGROUND OF THE INVENTION

The MicroCube Interconnection Hardware described in this application comprise three combinations of a MicroCube Precision Fitting and various enhancements that are employed in precision pneumatic and hydraulic control systems. The MicroCube is a miniature precision connection device for welding together fittings, tubes, conduits, and manifolds. The MicroCube Precision Fitting is depicted, described, and claimed in a U.S. patent application Ser. No. 07/193,262 by the same inventors which was filed on May 11, 1988. The specification and drawings of that prior application are hereby incorporated by reference.

A multitude of industrial processes require precise handling of gases and liquids. Streams of these fluids must be transported through supply lines, introduced into various enclosures or components, and finally expelled. Many fabrication techniques involve pressure control, the regulation of supply gases, and the measurement of temperature, pressure; and flow-rates. The devices that are currently available for these tasks are generally heavy bulky components that occupy a great deal of volume and planar space. The large size of conventional devices is an exceptionally serious concern among engineers and manufacturing system designers in the semiconductor industry. The production of integrated circuits requires highly precise control, regulation, and measurement of gases which are conducted in and out of vapor deposition chambers that are employed to fabricate semiconductors. Integrated circuits are generally manufactured within these chambers by growing semiconductor, insulator, or conductor materials layer by layer on thin circular substrates called wafers. This delicate process must be carried out in extremely clean environments. Tiny particles of dust can contaminate the fabrication materials and ruin very expensive integrated circuits. The "clean-rooms" that are utilized for manufacturing the semiconductor chips are enormously costly to build and operate. For this reason, equipment that is used within the clean-room must occupy as small a space as is reasonably possible. Any reduction in volume and planar space that can be achieved by the designers of pneumatic control devices produces direct and substantial savings for the integrated circuit manufacturer.

These potential cost savings provide great incentives for the chip industry to find new an more efficient ways to perform tasks within the clean-room environment. Since the quality of the finished circuit depends largely on the producer's ability to precisely control, regulate, and measure many different gases that are associated with the fabrication chamber, pneumatic and hydraulic control, regulation, and measurement tools each play a critical role in this process. Miniaturized interconnection hardware devices that are capable of controlling, regulating, and measuring high pressure flows of gas would fulfill a long felt need in the semiconductor industry. Such novel devices would occupy less of the precious space inside the clean-room, but would not compromise the high levels of performance and reliability that are presently achieved using much larger and bulkier implements.

SUMMARY OF THE INVENTION

The MicroCube Interconnection Hardware described and claimed in this patent application solve the problems of excessive size and volume that are encountered when conventional welded fittings are utilized in combination with pneumatic and hydraulic control, regulation, and measurement systems.

The Microcube is a substantially cubical integral body that encloses a central chamber but which has no internal or external welded joints or seams. Instead of using branches or tubular appendages, the invention incorporates at least one port that includes a support wall and an annular counterbored step which facilitate precise alignment and a snug physical fit for an external tube or another fitting. The Microcube is united to a fluid line by a interior weld that presents its smoothest surface toward the flow of substances through the fitting. The heat of this inside weld melts the counterbored step, which becomes the filler metal for the weld bond. Although the Microcube is named to suggest the geometrical shape of the inventors' preferred embodiment, the invention may be embodied in a wide variety of configurations, including a sphere, disc, torus, or cylinder.

The MicroCube Interconnection Hardware depicted in the drawings that follow are grouped into three separate categories: the MicroVac Vacuum Generator, the MicroControl Module, and the MicroSensor. Each of these three embodiments of MicroCube Interconnection Hardware is a combination of the MicroCube and enhancements the enable a semiconductor fabrication engineer to better control, regulate, and measure gas flows in a manufacturing environment.

The MicroVac Vacuum Generator comprises a central MicroCube Precision Fitting having an inlet, a contaminant port, and an outlet. A first stage resides within the inlet and a second stage is secured inside the outlet. The first and second stages are aligned in a coaxial configuration. The contaminant port is extends out from the MicroCube and is orthogonal t o both the first and second internal stages. Both the first and second stages successively compress and expand a high pressure flow of gas which is introduced into the MicroVac Vacuum Generator through an aperture in the inlet. The high pressure flow is exhausted through an aperture in the outlet. The stream through the center of the MicroVac creates a vacuum pressure at the contaminant port which may be used to clean and purify an external chamber or enclosure which has been polluted with dirt particles or impurities. A side port may be fitted to the invention to control or measure the operation of the MicroVac.

The MicroControl Module is a combination of several MicroCube Precision Fittings and conventional control, regulation, and measurement instruments. Several MicroCubes are incorporated with a number of valves, fittings, pressure regulator and relief valves, and sensors into a system for providing gas supplies and gas purification for a semiconductor fabrication chamber. The MicroControl Module may include one or more MicroSensors and a MicroVac Vacuum Generator. Due to its greatly miniaturized design, the MicroControl Module consumes far less space or volume than any other currently available gas system.

The MicroSensor is a combination of a MicroCube Precision Fitting and a temperature, pressure, or flow-rate sensor for monitoring a gas within a pneumatic or hydraulic supply or purge line. One or more of these sensors is welded directly to a MicroCube Precision Fitting. As with the MicroControl Module, the great advantage provided by the MicroSensor is the saving of precious space and volume within an expensive cleanroom environment.

An appreciation of other aims and objects of the present invention and a more complete and comprehensive understanding of this invention may be achieved by studying the following description of a preferred embodiment and by referring to the accompanying drawings.

BRIEF DESCRIPTION OF THE DRAWINGS

FIG. 1 is a cross-sectional view of a MicroVac Vacuum Generator including its first and second stages.

FIG. 2 presents cross-sectional, top, and end views of the MicroVac Vacuum Generator before the first and second stages have been inserted.

FIG. 3 depicts the first stage of the MicroVac Vacuum Generator in side and cross-sectional views.

FIG. 4 reveals the second stage of the MicroVac Vacuum Generator in a cross-sectional view and in a side view.

FIG. 5 is a plan view of a MicroControl Module incorporating MicroCube Precision Fittings.

FIG. 6 is a plan view of a MicroSensor incorporating a MicroCube Precision Fitting.

DESCRIPTION OF A PREFERRED EMBODIMENT

MicroVac Vacuum Generator

FIG. 1 is a cross-sectional view of the MicroVac Vacuum Generator including first and second stages which are depicted in greater detail in FIGS. 2, 3, and 4. In all of the drawing FIGS. 1 through 4, the terms "front" and "forward" refer to the side of the vacuum generator having the inlet. The opposite side which has the relatively longer outlet, is denoted by the terms "back" or "rear". Generally, the front or forward side is shown on the left and the back or rear side is shown on the right in cross-sectional views.

The MicroVac Vacuum Generator 110 includes a housing 111 which incorporates a MicroCube Precision Fitting 112. The bottom surface 113 of the MicroCube 112 is continuous and closed. An inlet 114 extends out from the MicroCube's forward side. The inlet walls 116 enclose an aperture 118 and an inlet antechamber 120. The first stage 121 of the vacuum generator 110 is held snugly in place by friction forces within the inlet 114. The forward end of the first stage 121 has exterior bevels 121A, best viewed in FIG. 3. The forward walls 122 lead into interior bevels 123 and compression chamber 124, which, in turn, communicates with central chamber 125 and expansion chamber 126 bounded by gently sloped walls 127. The rear wall 129 of first stage 121 encloses rear aperture 130, extends into the central chamber of MicroCube 112, and faces the second stage which is aligned to first stage 121 in a coaxial relationship. A contaminant stage port 131 extends out of MicroCube 112 in a direction that is perpendicular to the longitudinal axis of inlet 114. Port 131 has walls 132 which enclose an aperture 133. An upper chamber 134 leads to the central chamber 136 of the MicroCube 112. The outlet 137 includes walls 138 and an exhaust aperture 140 which is preceded by an exhaust chamber 141. The second stage 142 is located within walls 138 and has forward exterior bevels 143 and a circumferential rear exterior notch 145, which are most easily viewed in FIG. 4. Exhaust gases from second stage 142 are expelled past rear wall 146 through aperture 144. The internal structure of the second stage 142 includes gently sloped expansion chamber wall 148, expansion chamber 150, central chamber 152, compression chamber wall 154, and compression chamber 156. The forward wall 158 faces a first and second stage interface zone 160 and surrounds a forward aperture 162. FIG. 2 reveals an optional side aperture 164 which may be used to control or monitor the operation of the MicroVac Vacuum Generator 110. Aperture 164 is enclosed by a counterbored step 166 formed on MicroCube 112. An end cap 168 is shown closing an opposite side port 170 in FIG. 2.

The MicroVac Vacuum Generator typically utilizes a 100 pound pressure flow of 45 liter per minute at inlet 114 to generate a vacuum pressure of 25 inches of mercury. The ratio of the aperture of first stage 121 to the diameter of central chamber 125 determines the velocity of the gas flow, which, in turn, determines the level of vacuum pressure developed in contaminant port 131. The expansion chambers 126 and 150 provide for gradual expansion in the gas stream which induces laminar flow and reduces turbulence. The slope of the internal surfaces of the first and second stages is generally four degrees.

MicroControl Module and MicroSensor

FIG. 5 illustrates a MicroControl Module 510 which includes several MicroCube Precision Fittings 512. The various components described below are connected with conventional sections of tubing 514. Two of the MicroCubes shown in FIG. 5 are components of MicroSensors 516. FIG. 5 also contains a MicroVac Vacuum Generator 521 which includes a MicroSensor 516A, that, in turn, includes a MicroCube 512.

An inlet 517 is connected through filter 518 and VCR fitting 520 to a first valve 522A which leads to first MicroCube 512A. This first MicroCube 512A is connected via tubing sections 514 to a second valve 522B and a pressure regulator 524. The second valve 522B leads to a second MicroCube 512B, which is coupled to both an inert gas fitting 526 and to a third valve 522C. The inert gas fitting 526 receives a supply of inert gas like argon, helium, or nitrogen from an external supply (not shown) through inert gas supply line 527. The third valve 522C conducts gas to a MicroVac Vacuum Generator 521 which includes first MicroSensor 516A, which is, in turn, coupled to both a fourth valve 522D and to a vent line 528 through a tube 514. The fourth valve 522D is linked to a second MicroSensor 516B that is connected to regulator 524, to a fifth valve 522E, and to an excess pressure valve 530. Finally, the fifth valve 522E conveys gas to a third MicroCube 512C that is attached to a process gas fitting 532.

FIG. 6 reveals more detail of MicroSensor 516, comprising a combination of MicroCube 512, a connecting tube 514, and a conventional temperature, pressure, or flow-rate sensor 610.

A supply of gas enters the MicroControl Module through inlet 517, flows through the opened first valve 522A, first MicroCube 512A, pressure regulator 524, second MicroSensor 516B, opened fifth valve 522E, and out of the assembly through third MicroCube 512C and process gas fitting 532. During this operation, second valve 512B and fourth valve 512D must be closed.

When a contaminated external vessel or enclosure (not shown) requires purging, the MicroControl Module 510 is adjusted so that the second and fourth valves 522B and 522D are closed and third valve 522C is open. An inert gas is pulled to vent line 528 through fitting 526 from supply line 527 by the action of MicroVac Vacuum Generator 521, whose structure and function are described in full detail above.

The MicroControl Module may be mounted within a gas tank cabinet that is associated with a semiconductor fabrication chamber. The great reduction in size and volume of this invention results in great cost savings for integrated circuit producers.

The MicroCube Interconnection Hardware described in this application comprise unique innovations that will be utilized in a wide variety of industrial and commercial settings that demand high quality, user worthy, precision systems.

Although the present invention has been described in detail with reference to a particular preferred embodiment, persons possessing ordinary skill in the art to which this invention pertains will appreciate that various modifications and enhancements may be made without departing from the spirit an scope of the claims that follow.

LIST OF REFERENCE NUMERALS

FIGS. 1, 2, 3, & 4

Microvac Vacuum Generator

110 MicroVac Vacuum Generator
111 Housing
112 MicroCube
113 Bottom of MicroCube
114 Inlet
116 Inlet walls
118 Inlet aperture
119 First stage body
120 Antechamber
121 First stage
121A Exterior bevel
122 Forward wall of first stage
123 Bevel
124 Compression chamber
125 Central chamber
126 Expansion chamber
127 Expansion chamber wall
128 Central chamber wall
129 Rear wall of first stage
130 Rear aperture
131 Contaminant stage port
132 Walls
133 Aperture
134 Upper chamber
136 MicroCube central chamber
137 Outlet
138 Walls
140 Outlet exhaust aperture
141 Exhaust chamber
142 Second stage
143 Forward exterior bevel
144 Second stage rear aperture
145 Rear exterior notch
146 Second stage rear wall
148 Expansion chamber wall
150 Expansion chamber
152 Central chamber
154 Compression chamber wall
156 Compression chamber
158 Forward wall of second stage
160 First and second stage interface zone
162 Forward aperture of second stage
164 Side aperture
166 Counterbored step
168 End cap
170 Closed side

LIST OF REFERENCE NUMERALS

FIGS. 5 and 6

Microcontrol Module and Microsensor

510 MicroControl Module
512A First MicroCube
512B Second MicroCube
512C Third MicroCube
514 Tube connection
516A First MicroSensor
516B Second MicroSensor
517 Inlet
518 Inlet filter
520 Inlet fitting
521 MicroVac Vacuum Generator
522A First Valve
522B Second Valve
522C Third Valve
522D Fourth Valve
522E Fifth Valve
524 Pressure Regulator
526 Inert gas fitting
527 Inert gas supply line
528 Vent line
530 Excess pressure valve
532 Process gas fitting
610 MicroSensor

What is claimed is:

1. A MicroVac Vacuum Generator comprising in combination:

a MicroCube Precision Fitting having a unitary substantially cubical body and having a central chamber;

said body having at least one external port in communication with said central chamber;

said port further including an annular counterbored step;

an inlet coupled to said MicroCube Precision Fitting having an aperture for receiving a high pressure flow of gas;

a first stage disposed within said inlet and in communication with said inlet for successively compressing and expanding said flow of gas;

a contaminant port coupled to said MicroCube Precision Fitting for connection to a contaminated volume;

said contaminant port being disposed generally perpendicular to said first stage;

an outlet coupled to said MicroCube Precision Fitting having an aperture for exhausting said high pressure flow of gas;

a second stage disposed within said MicroCube Precision Fitting for successively compressing and expanding said flow of gas; and said second stage being oriented substantially coaxially with said first stage.

2. A MicroControl Module comprising in combination:

a gas filter and an inlet fitting connected to an inlet;

a first valve connected to said inlet fitting and to a first MicroCube Precision Fitting;

said first MicroCube being further connected to a pressure regulator and a second valve;

said second MicroCube Precision Fitting being connected to an inert gas fitting;

said inert gas fitting being connected to an inert gas supply line, said second MicroCube being further connected to a third valve;

said third valve being connected to a first MicroSensor including a MicroCube and a gas sensor;

said first MicroSensor being further connected to a vent line and a fourth valve;

said fourth valve being connected to a second MicroSensor;

said second MicroSensor being connected to said pressure regulator, to said fourth valve, to a fifth valve, and to an excess pressure valve;

said fifth valve being further connected to a process gas fitting; and each of said MicroCube Precision Fittings having a unitary substantially cubical body and having a central chamber;

said body having at least one external port in communication with said central chamber;

said port further including an annular counterbored step.

3. A MicroControl Module as claimed in claim 2 in which:

said gas sensor is a temperature sensor.

4. A MicroControl Module as claimed in claim 2 in which:

said gas sensor is a pressure sensor.

5. A MicroControl Module as claimed in claim 2 in which:

said gas sensor is a flow-rate sensor.

6. A MicroControl Module comprising in combination:

a gas filter and an inlet fitting connected to an inlet;

a first valve connected to said inlet fitting and to a first MicroCube Precision Fitting;

said first MicroCube being further connected to a pressure regulator and a second valve;

said second MicroCube Precision Fitting being connected to an inert gas fitting;

said inert gas fitting being connected to an inert gas supply line, said second MicroCube being further connected to a third valve;

said third valve being connected to a MicroVac Vacuum Generator including a first MicroSensor having a Microcube and a gas sensor;

said MicroVac Vacuum Generator being further connected to a vent line and a fourth valve;

said fourth valve being connected to a second MicroSensor;

said second MicroSensor being connected to said pressure regulator, to said fourth valve, to a fifth valve, and to an excess pressure valve;

said fifth valve being further connected to a process gas fitting;

each of said MicroCube Precision Fittings having a unitary substantially cubical body and having a central chamber;

said body having at least one external port in communication with said central chamber;

said port further including an annular counterbored step; and said MicroVac Vacuum Generator including:

a MicroCube Precision Fitting having a unitary substantially cubical body and having a central chamber;

said body having at least one external port in communication with said central chamber;

said port further including an annular counterbored step;

an inlet coupled to said MicroCube Precision Fitting having an aperture for receiving a high pressure flow of gas;

a first stage disposed within said inlet and in communication with said inlet for successively compressing and expanding said flow of gas;

a contaminant port coupled to said MicroCube Precision Fitting for connection to a contaminated volume;

said contaminant port being disposed generally perpendicular to said first stage;

an outlet coupled to said MicroCube Precision Fitting having an aperture for exhausting said high pressure flow of gas;

a second stage disposed within said MicroCube Precision Fitting for successively compressing and expanding said flow of gas; and said second stage being oriented substantially coaxially with said first stage.

7. A MicroControl Module as claimed in claim 6 in which:

said gas sensor is a temperature sensor.

8. A MicroControl Module as claimed in claim 6 in which:

said gas sensor is a pressure sensor.

9. A MicroControl Module as claimed in claim 6 in which:

said gas sensor is a flow-rate sensor.

10. A MicroSensor comprising in combination:

a MicroCube Precision Fitting having a unitary substantially cubical body and having a central chamber;

said body having at least one external port in communication with said central chamber;

said port further including an annular counterbored step; and a gas sensor.

11. A MicroSensor as claimed in claim 10 in which:
said gas sensor is a temperature sensor.

12. A MicroSensor as claimed in claim 10 in which:
said gas sensor is a pressure sensor.

13. A MicroSensor as claimed in claim 10 in which:
said gas sensor is a flow-rate sensor.

* * * * *